United States Patent [19]

Rashad

[11] Patent Number: 5,777,808
[45] Date of Patent: Jul. 7, 1998

[54] DUAL MIRROR BEAUTY ENSEMBLE

[76] Inventor: Robin Winona Rashad, Windy Hill Br 8000, Windy Hill Rd., Marietta, Ga. 30067

[21] Appl. No.: 439,221

[22] Filed: Mar. 16, 1995

[51] Int. Cl.⁶ .............................. G02B 5/08; G02B 7/182
[52] U.S. Cl. ..................... 359/855; 359/856; 359/857; 359/865; 359/881
[58] Field of Search ........................... 359/855, 856, 359/857, 862, 865, 872, 879, 880, 881, 882; 248/477, 479, 480, 481

[56] References Cited

U.S. PATENT DOCUMENTS

| | | | |
|---|---|---|---|
| 115,898 | 6/1871 | Roberts | 359/881 |
| 956,032 | 4/1910 | Birdwell | 359/880 |
| 1,015,810 | 1/1912 | Maccue | 359/865 |
| 1,324,133 | 12/1919 | Roy | 359/882 |
| 1,338,582 | 4/1920 | Morris et al. | |
| 1,451,236 | 4/1923 | Stanfield | 359/881 |
| 1,989,437 | 1/1935 | Weisz | 359/865 |
| 2,192,159 | 2/1940 | Simjian | 359/881 |
| 2,598,291 | 5/1952 | O'Brien | 359/879 |
| 3,072,017 | 1/1963 | Levy | 359/881 |
| 3,709,585 | 1/1973 | Tsai | 359/865 |
| 3,806,189 | 4/1974 | Simjian | 359/881 |
| 4,119,107 | 10/1978 | Pinzone et al. | 359/881 |

FOREIGN PATENT DOCUMENTS 0499515  1/1939  United Kingdom .................. 359/879

*Primary Examiner*—Ricky D. Shafer

[57] ABSTRACT

A Dual Mirror Beauty Ensemble comprising quadruple mirrors sectioned to become dual. The mirrors connect to a brace supported by universal-joints and poles, that pivot the mirrors respectively to one another. The front brace/support is releasably connecting to back parallel support poles, that are removably fastened to a chair by a pair of straps. The brace and clamps are constructed to telescope both vertically and horizontally to accommodate different chair heights and user physiques.

3 Claims, 6 Drawing Sheets

DUAL MIRROR BEAUTY ENSEMBLE

FIELD OF INVENTION

The present invention relates to a new Dual Mirror Beauty Ensemble, and in particular to a pair of angled mirrors, that are mounted to a singular tubular support frame, that is telescoping to accommodate various chair types as well as user physiques, to aid the user in viewing the entire head.

DESCRIPTION OF PRIOR ART

With as much emphasis being placed on hair in the past as is to the present day, and the expensive cost to maintain the hair; attempts have been made to consummate such a device that will aid the user in performing self-hair-styling techniques, while simultaneously viewing the back of the head; which in-turn will cut expensive cost in maintaining the hair.

No prior device is known however; for projection of an effective view of the entire head while performing various timely self-hair-styling techniques, using an apparatus that is easily and accurately positioned, in a more comfortable viewing and styling position. The previous art evinced by prior U.S. Patents are not consummated, for the reason that; conscientious thought was not given in implementing such a device to perform such a task; as with the three mirror apparatus used in conjunction with a further front mounted, stationary mirror, such as that of:

The Cleve U.S. Pat. No. 2,687,674 describes a detachable mounted, mirror assembly secured to the back of a specific type chair. A three way foldable mirror mounted by tubes to a horizontal bar, which has a pair of clamps extending downward and designed to grasp the cross bar of a chair back. The mirror adjusts vertically by the use of a slideable rod assembly connecting the mirror to the bar base. The operator attempts to view the back of the head during the self-hair-dressing operation, using a further front mounted stationary mirror.

The Morris et al. U.S. Pat. No. 1,338,582 describes a boudoir chair, comprising an angled three-way mirror which can be mechanically raised or lowered into the back rest housing of the chair, and contemplates using the vertically adjustable mirror of the chair in concert with a mirror of a free-standing dressing table, attempting to allow a person to view the back of the head while styling the hair and also has to be used with a further mirror.

The Simjian U.S. Pat. No. 4,557,520 also describes a chair with a moving seat and mirror, comprising a seat mounted on a rotatable mechanism which in-turn, is supported on legs. A mirror supported above the seat by a vertical arm. It is contemplated that this mirror will cooperate with a stationnary vertically mounted mirror disposed in front of the chair, such as a mounted stationary mirror. Sitting in a chair of this type, (one that has no back support) can be very uncomfortable to the user when performing various timely hair styling techniques.

As a result of a three mirror ensemble in the aforementioned inventions, comprising mirrors mounted on the sides of a main mirror; a user attempting self-hair-dressing techniques, would have to continuously move the side mirrors forward and backward, in order to raise the arms behind the head to acquire the space that is needed to comb the hair and simultaneously view the back of the head. Thus; mirrors constructed on the sides of a main mirror are not suitable for someone who is performing timely hair styling techniques such as: weaving, coloring, braiding, bonding and cutting the hair, therefore; the hair styling techniques cannot effectively be carried out. Moreover; if this could be accomplished, having to view the back of the head from mirrors mounted from the sides can cause discomfort and strain to the eyes of the user when ones' eyes are fixated in a corner viewing position. As a matter of fact; mirrors constructed from the sides get in the way and defeats the purpose, and are not needed. The same applies to the A. A. Libby U.S. Pat. No. 3,463,440 and the Coulson U.S. Pat. No. 4,269,382.

The A. A. Libby Pat. describes detachable mounted reflective panels for use with lawn furniture and the like, comprising two panels angled or adjusted in a horizontal or vertical direction. The patent contemplates universal adjustment of the panels so that a sunbather can get exposure to the sun. The patent contemplates methods of mounting the panels to a chair frame, including molded clamps, screw attachments, and U-shaped tubular members, that has a frame having confronting members positioned behind the chair back and provided with hooks to hang over a chair back or by ties which can fasten the frame to the chair. And also has to be used with a further mirror to attempt view of the back of the head.

The Sears U.S. Pat. No. 1,026,706 describes a combination chair, comprising a chair having a back and arms constructed to conceal mirrors and toilet articles. The chair back contains a pocket to receive a U-shaped support. The support member is held in position by springs. A hinge and swinging bracket is attached to the other arm. The mirror is pivoted on the support to allow adjustment vertically for viewing, but; does not pivot around at an angle for proper viewing of the back of the head. The arms of the U-shaped support holds a mirror so that the user attempts view of the back of the head while a person is in the chair. The Sears Pat. is constructed to serve only the purpose that it is designed for, it is basically a toilet seat, and is not properly constructed in order to view the back of the head for hair styling purpose. The Sears Pat., A. A. Libby Pat., Simjian Pat., and the Morris Pat. mirror assemblies are designed to fit a specific type chair and are bulky, expensive, heavy in weight, complicated and hard to assemble.

The Schmid U.S. Pat. No. 5,223,984 describes an adjustable hair grooming mirror apparatus comprised of a mounting assembly for securing a mirror apparatus to ceiling. The mirror frames are suspended from and carried by the mirror assembly that holds a pair of angled mirror panels that can be raised and lowered by a draw cord with respect to a front fixed mirror. By looking in the front mounted mirror the user contemplates the view of the rear portion of his head. Having mirrors constructed and mounted at an angle, over the top of the users head makes it difficult to view the back of the head; it is impossible to reflect view of the back of the head from mirrors mounted from the ceiling using a front mounted mirror. The Schmid invention is also used with a tripod, and is difficult and time consuming for one to understand and to learn its operating procedure.

The Coulson U.S. Pat. No. 4,269,382 describes a height-adjustable rear view hair styling mirror composed of a mirror attached by brackets to a frame having three legs connected by hinges which allow the frame to close flat for storage. The mirror is vertically adjustable on the frame by moving bolts which pass through a series of spaced holes. This is a free-standing apparatus. As with the Coulson Pat., it is difficult to attain a comfortable sitting position, that is needed in order to perform various timely hair styling techniques and must be used with a further mounted stationary mirror. Thus; all of the mounted, stationary front mirrors used in conjunction with their apparatus in the aforementioned inventions, do not pivotally rotate nor counter-rotate at a 180°, they do not easily move from side to side at an angle for proper viewing, and do not give a close accurate view of the entire head. For these reasons; the further front mounted, stationary mirrors are not properly constructed. Furthermore; there is too much distance between the front mounted stationary mirror and the back mirror to reflect proper viewing. Therefore; a front mirror will have to be used in close proximity, pivotally rotatable, and adjustably angulated in order to effectively reflect view the back of the head; such as that of "The Dual Mirror Beauty Ensemble" which houses a rotator ball, and an adjustable pole that is easily pivotal and moves at a designated angle. Construction in this manner accomplishes a more accurate viewing angle, a closer view, in a more comfortable styling and sitting position, with no discomfort or strain to the eyes while viewing the back of the head.

OBJECT OF THE INVENTION

The primary object of the present invention is to provide a one unit ensemble, a brace support that is removably fastened to a chair by a pair of straps, with the front portion of the brace being detachable to allow the user to free himself to take a break, for what ever reason deemed necessary, and re-attaches to resume use.

Another primary object of this invention is to provide a single tubular frame telescoping to accommodate various chair types, heights and user physiques.

It is a principle object of the present invention to provide quadruple frames and mirrors sectioned to become a dual pair of angled frames and mirrors. The front mirrors are pivotable with the smaller front frames and mirrors positioned relative to the larger back frames and mirrors to aid in reflecting view of the entire head.

A further object of the present invention is to construct such a device that is inexpensive, useful, easy to use, and used by both men and women, to aid in grooming the hair.

Yet a further object of this invention is to provide a device that is light in weight, easily transportable and easy to assemble.

SUMMARY OF INVENTION

"The Dual Mirror Beauty Ensemble" is a one unit ensemble that is designed to effectively facilitate the user in viewing the back of the head while performing various timely self hair styling techniques such as: bonding, weaving, braiding, cutting, and coloring the hair in a more suitable, visible, more accurate viewing and comfortable styling position, while simultaneously enabling the user to use both hands to prepare the hair and carrying out the hair styling techniques. "The Dual Mirror Beauty Ensemble" comprises quadruple mirrors and frames sectioned to become dually relative to a pair of corresponding back mirrors and frames. Both front and back mirrors and frames are pivotable and connected to poles, which connects to universal-joints, attached to poles that are mounted to a tubular support bar, that connects to a pair of parallel poles to form a brace. Surrounding the back parallel tubular support poles are clamps that support the brace in an up-right position, and move up and down the poles to adjust to the users physique. Constructed around the poles are a pair of straps that are strapped around the chair to support and hold the brace in an up-right position.

***(A more detailed description will be accompanied by drawings in the detailed description portion of the text.)

DETAILED DESCRIPTION OF DRAWINGS

Figure 1:
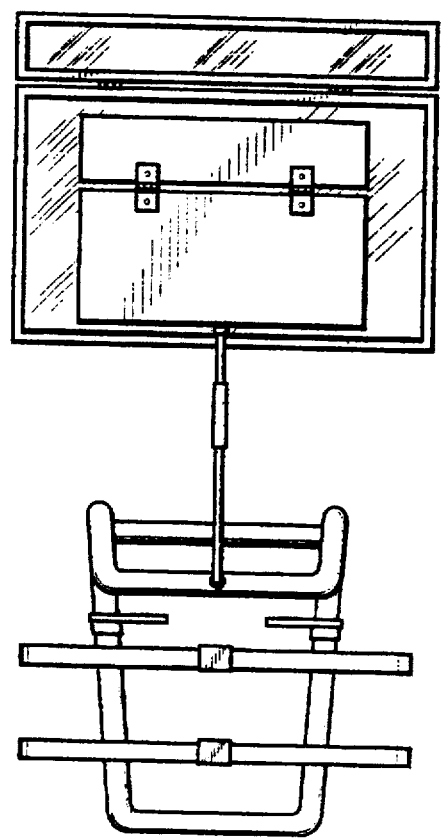
FIG. 1 shows a panoramic view of the ensemble with adjustable clamps turned inward.
Figure 2:
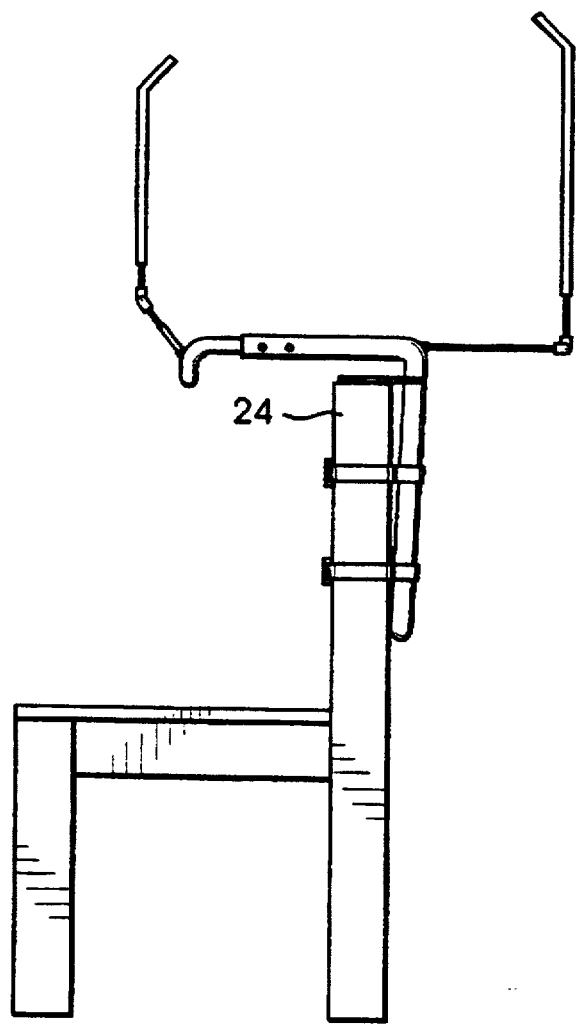
FIG. 2 shows a side view of the ensemble in a standard position supported and attached to the chair by suitable means of a pair of straps and clamps, with the ensemble slightly elevated.

Referencing FIG. 1 is a panoramic view of the preferred embodiment of the invention. FIG. 2 shows a side view of the ensemble in a standard position attached to a chair 25 by suitable means of a pair of straps 26, and clamps 31 slightly elevated to adjust to the users height.

Figure 3:
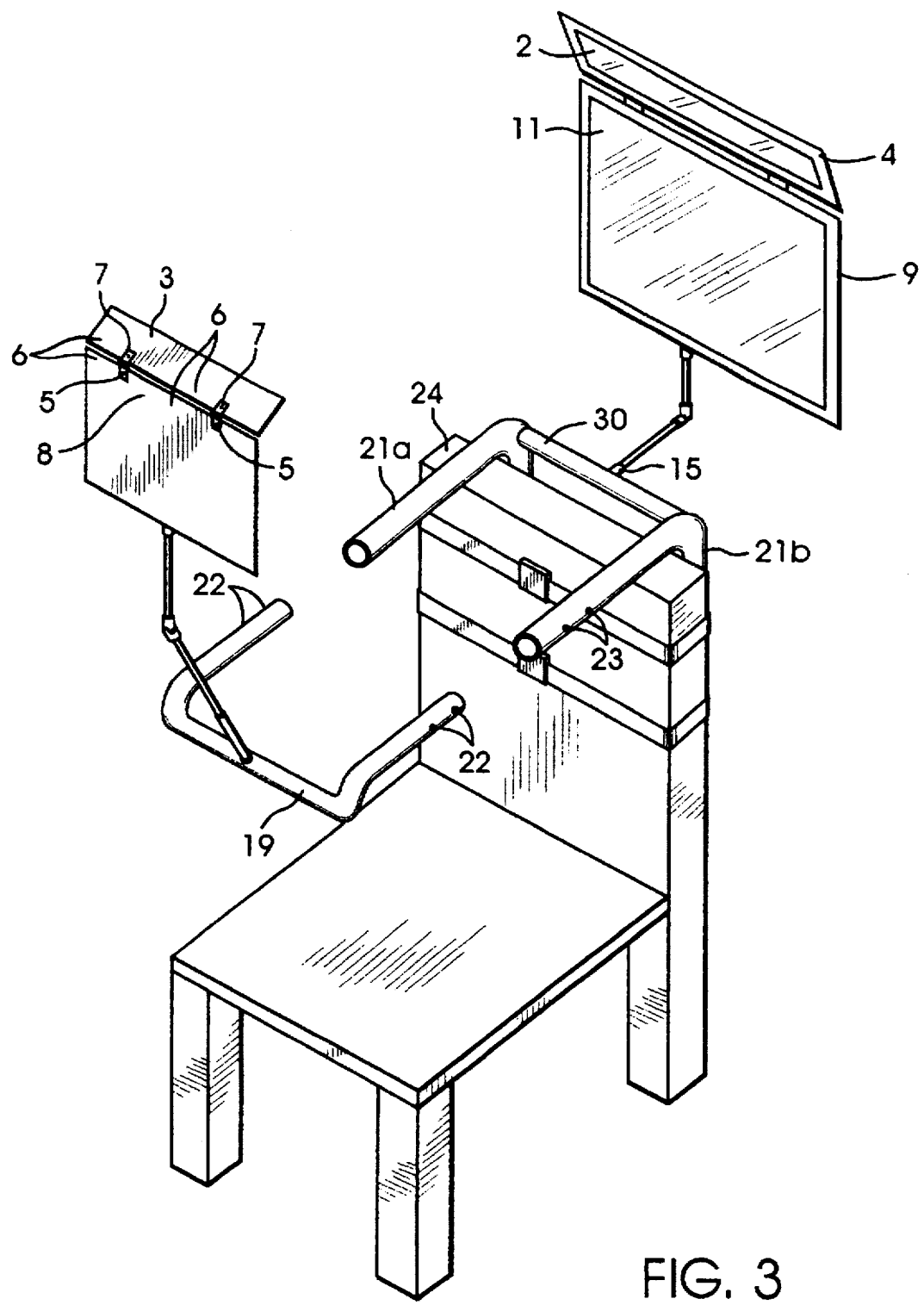
FIG. 3 is an angled view of the ensemble over a chair in a broke-down position without the clamps.

Refer now to FIG. 3 "The Dual Mirror Beauty Ensemble" comprising quadruple rectangular mirrors and frames. The front mirrors and frames are sectioned to become dually relative to the back mirrors and frames. A front top rectangular mirror panel 1 (4×12" in size), and a front top rectangular frame 3 is of the same size of its' accompanying mirror panel 1. The back bottom horizontal portion of the top frame 3 is connected by means of adjustable hinges 5 and screws 6, that screw into the eyelets 7 of a set of hinges 5 to the back top horizontal portion of a larger frame 8, with a slight opening between the frames 3 and 8 to enable the top mirror 1 and frame 3 to move back-and-forth to a designated position, to view the front top portion of the head, and also reflect the back top portion of the head from the back mirror 2 when viewed in the front mirror 1. The bottom front frame 8 surrounds a (10×12") front mirror 10. The said front mirror 10 is used to view the face and the sides of the user's head, and is also used to reflect view of the back of the user's head when viewed in the back mirror 11.

Figure 6:
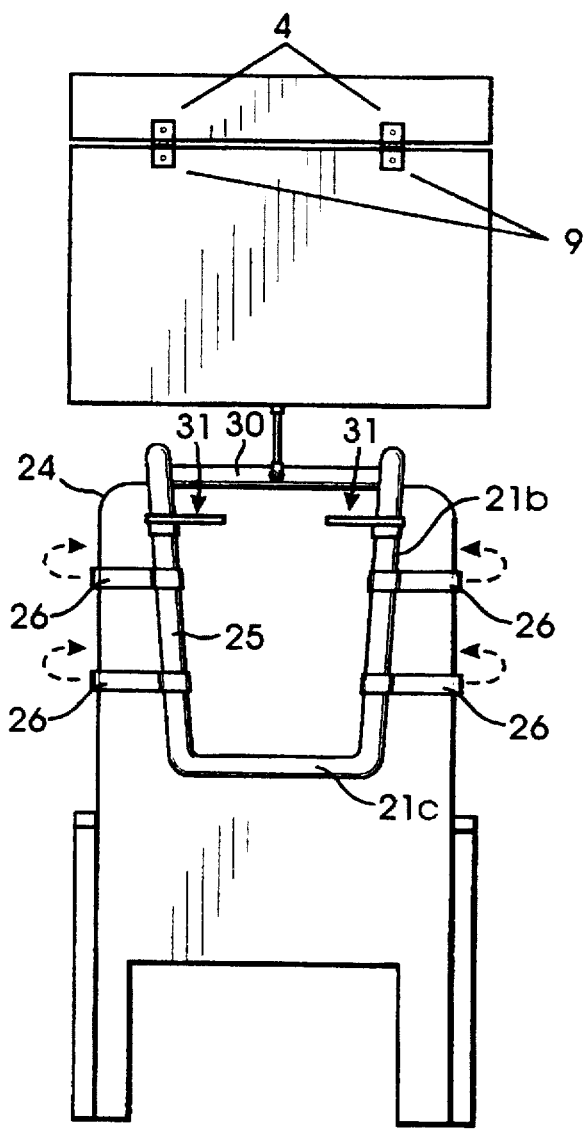
FIG. 6 is a closer back view of the elongated tubular poles, straps and clamps secured around the poles.

Refer to FIG. 3 & 6 a back top rectangular mirror panel 2 (4×15" in size), and the back top rectangular frame 4 is of the same size of its accompanying mirror panel 2. The bottom horizontal portion of the top frame 4 is connected by means of adjustable hinges 5 and screws 6, that screw into the eyelets 7 of a set of hinges 5 to the back top horizontal portion of a larger frame 9, with a slight opening between the frames 4 and 9 to enable the top mirror 2 and frame 4 to move back-and-forth to a designated position. Mirror 2 is used to view the back top portion of the head, when viewed in the front mirror 1. The bottom back frame 9 surrounds a (10×17") front mirror 11 and is used to view the back of the user's head when viewed in the front mirror 10.

**(all of the frames mentioned in this invention are made of hard plastic and covers the entire back portion of its accompanying mirror panels, and are approximately of the same size of its accompanying mirrors.)

Figures 4, 5:
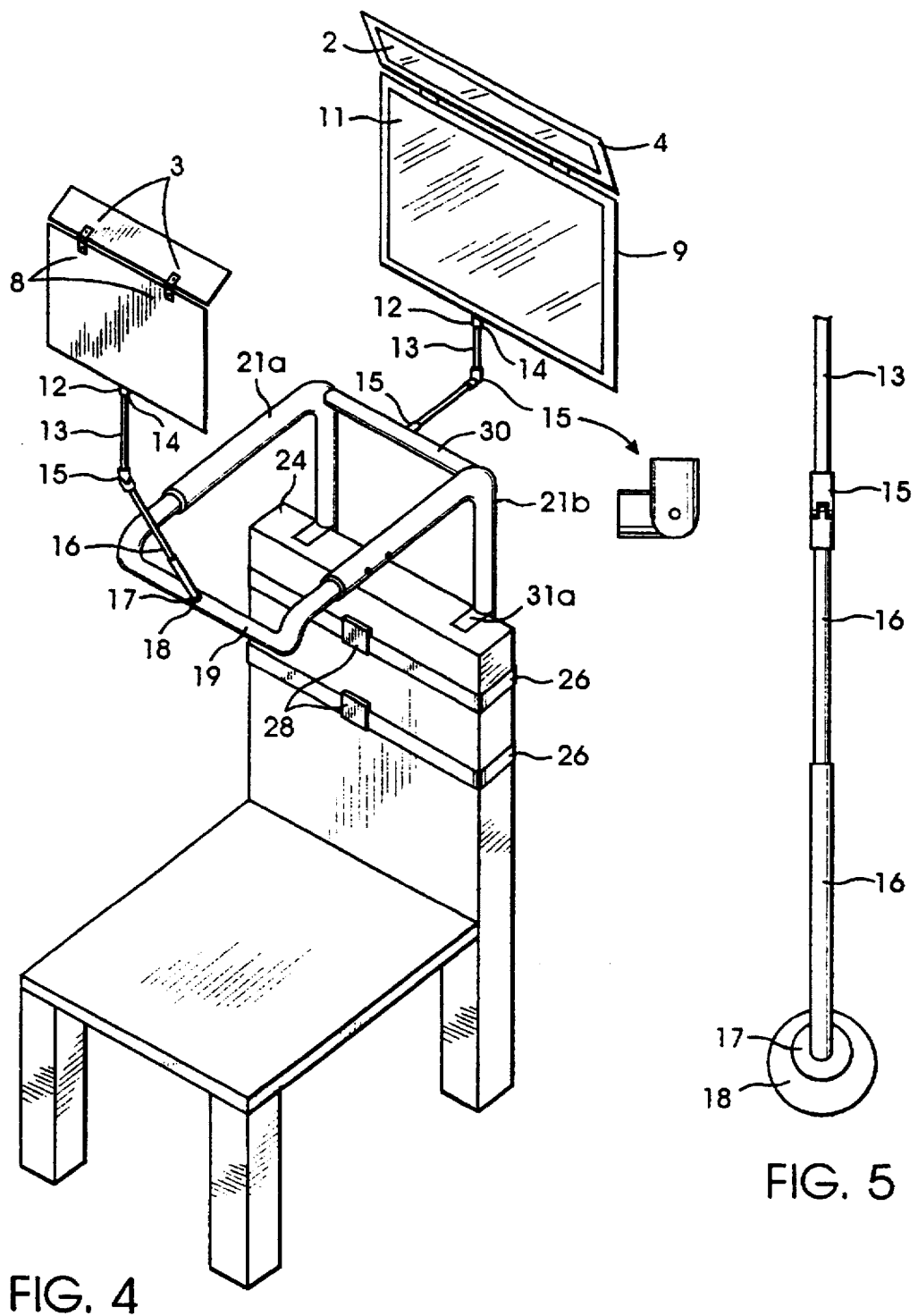
FIG. 4 is an angled view of the ensemble supported over a chair, with adjustable clamps as means to elevate the ensemble up-and-down to adjust to the users height and physique.
FIG. 5 is a closer view of the rotator ball, a pivotable adjustable front pole and a boot-shaped universal-joint in an up-right position.

Refer to FIG. 4 the bottom center horizontal portion of frames 8 & 9 take the form of small caps 12 made of hard plastic. Each of the said caps fit firmly over the top portion of each 3" longitudinal rod 13. (the caps are formed by means of a hole within the center of the plastic, around the circumference of the caps.) Each cap 12 is secured to the top of each rod 13 by means of a 1" capped screw 14 that screws into holes, made into the sides of each of the plastic caps 12 through holes made into the sides of the top portion of the 3" rods 13. The said rods 13 are constructed to hold the front and back mirror assembly firmly in place, and in an up-right position. The end portion of each of the top 3" rods 13 (front and back) is connected to the top portion of adjustably formable means of boot-shaped universal-joints 15. The end portion of the universal-joints are connected to a second rod that becomes pivotable and adjustable poles.

Referring now to FIG. 5 the front adjustable rod 13, the second rod (bottom rod) is a 4" extendable rod 16 that extends up to 8". The end portion of the said rod 16 is welded to the center open portion of a small metal rotator ball 17 that is surrounded by, and rotates inside of its casing 18. The said casing is a ¾ round hollow ball bearing device that covers ¾ portion of the said rotator ball 17, leaving ¼ of the rotator ball showing. (the rotator ball and its casing is much like the ball and casing used to rotate the front rear view mirror in an automobile). Refer to FIG. 4 the center of the casing 18 is mounted onto the top center portion of the front tubular support bar 19 by means of a 1½" screw, screwed into a hole made into the center bottom portion of the 15" inch front tubular support bar 19, up through a hole made into the center top portion of the front tubular support bar 19, through the bottom center portion of the casing to hold the rotator ball 17 snugly in its casing 18. Thus; the 3" rod 13, the boot-shaped universal joint 15, and the 4" extendable rod 16 takes the form of a pole, used in conjunction with the snugly fitted rotator ball 17, surrounded by its casing 18, enables the pole to pivotally rotate the front mirror assembly from the left to the right, and counter-rotates back to a 180° angle. The said pole moves vertically and horizontally, and is adjustably extendable to move the front mirror assembly outward and inward to a designated position relative to the back mirrors. Moreover; these components used together enables the front mirror ensemble to effectively project a closer, more accurate view of the back and sides of the users, head when used in conjunction with the back mirrors; without causing discomfort or strain to the users' eyes.

Figure 7:
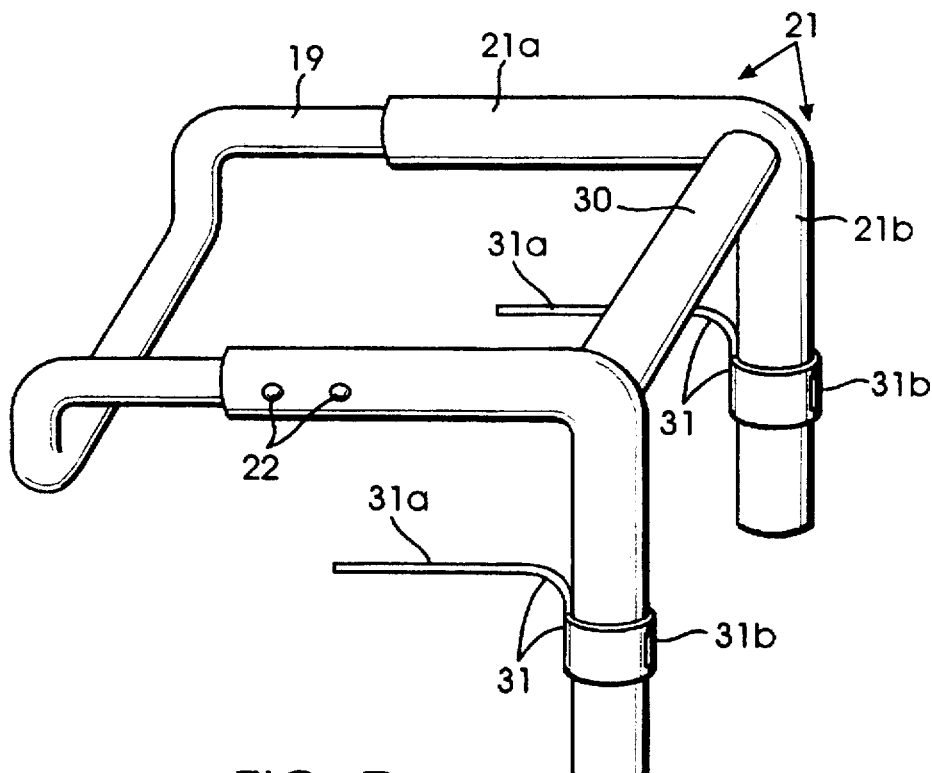
FIG. 7 shows a side view of the front and back portion of the brace and a closer side view of the clamps that surrounds the back poles.

Referring now to FIG. 3 the open-end portions of the front tubular support bar 19 are adjustably connected by means of two button-like spring loaded devices 22, that are inserted into the open-end portion of each side of the back parallel tubular support poles 21A, which house corresponding holes 23 made into the back parallel tubular support poles 21A. The buttons 22 are inserted and protrude to the outsides of the holes 23 to form the brace of the embodiment. The said support bar 19 is detachable to allow the user to free himself to take a break for what ever reason deemed necessary, and easily re-attaches to resume use. The 15" front tubular support bar 19 is also designed to adjust to the chest of the users physique by adjusting inward and outward of the accompanying poles 21A. Both the buttons and holes are 2" inches apart, as shown in FIG. 7 (the ends of the said bar are constructed much like the adjustable buttons and holes constructed on the handles of an older model baby carriage.) Manually push the buttons inside of the holes then push in or pull out to extend or to release the bar from the poles.

Referring now to FIG. 6 & 7 another important and unique feature of the embodiment is a pair of back parallel tubular support poles 21B constructed at an angle to fit over the top shoulder or neck portion 24 of the chair. Each side of the front tubular support poles 21a are 10" in length. The back vertical portion of the angled elongated poles 21B reaches 24" in length down the back lower portion of the said chair 25. The bottom portion of the back parallel tubular support poles 21B take the form of a back tubular 12" bar 21C, as a means to help support the ensemble against the said chair 25. The entire brace support of this embodiment 21 rests over most all type chairs. In this case a basic standard chair has been used to demonstrate and illustrate the use of this invention. The back parallel tubular support poles 21B are secured by a pair of 36" straps 26 fitted around the poles 21B and are attached by a 1½" stitch sewed onto the fabric of each strap 26. The straps 26 extend around to the front middle section of the chair 25, and are secured by means of a buckle 28 to hold, support and balance the ensemble in an up-right position. The said straps 26 are approximately 6" apart and lay horizontally parallel to one another, as shown in FIG. 4.

Referring now to FIG. 4 a back adjustable pole, the second rod (bottom rod) of the pole, is a 6" rod 29. The end of the said rod 29 is connected to the top portion of another universal-joint 15 that enables the back mirror assembly to remain in a stationary horizontal position. In that; it does not pivot from one side to the other, or vice-versa; but, does enable the back mirror assembly and its' components to move up-and-down, and back-and-forth, to a designated corresponding position relative to the front mirrors. The opposite end portion of the universal-joint connects to the center portion of a 15" horizontal back tubular support bar 30 by means of a capped-screw, screwed into holes made into the sides of said bar. The said bar 30 is located between the top angled portion of the top back parallel tubular support poles 21 and is connected by means of welding to hold the brace together.

**(The ends of the 15" horizontal tubular bar 30 and the angled portion of the back parallel tubular poles 21 may also be adjoined by means of screws.)

Figure 8:
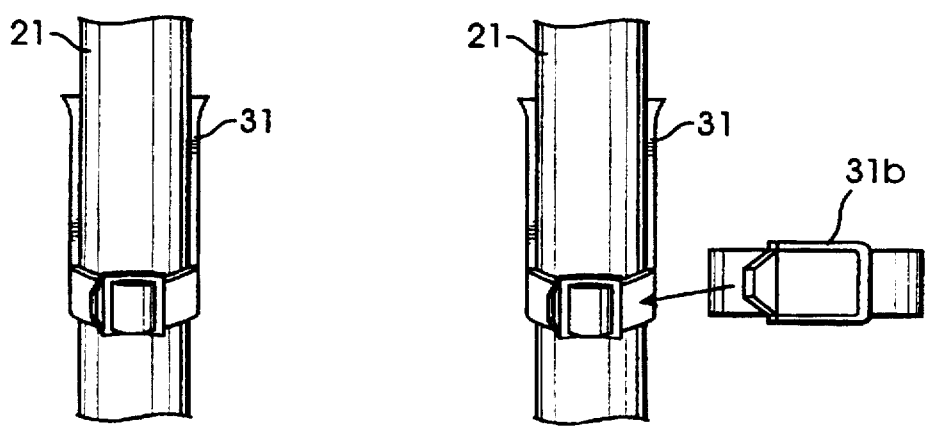
FIG. 8 shows a closer back view of the back parallel tubular support poles with clamps.

Refer to FIG. 7 & 8 located around each of the back parallel tubular support poles 21 are adjustable clamps 31. (the clamps look much like the clamps that fit securely around fire extinguishers.) Welded to the top back circular portion of each of the clamps 31 are blade-like planes 31A, bent at a 90° degree angle that form into one part 31. When the clamp lever 31B is open, (to open, the clamp lever is pulled up and over to the left side to release the back parallel tubular support poles 21B, and is pulled back to the right to re-attach.) this enables the back parallel tubular support poles 21B of the embodiment to be moved up-and-down to adjust to the height of the user. If the clamps 31 are not needed they are turned to the side or perhaps removed from the poles.

**(Some minor changes may be made in the actual developing stages.)

**(Solid poles rather than tubular pole may also be used in forming the brace portion of the embodiment.)

Having described my invention as being new and useful what I claim as my invention is:

1. A dual mirror beauty ensemble for use in combination with a chair comprising:
   a base;
   a first mirror assembly having a first end and a second end, said first mirror assembly including a first frame and a first mirror positioned in said first frame;

a first adjustable support having first and second ends, the first end of said first adjustable support is connected to said base and the second end of said first adjustable support is rigidly connected to a central portion of the first end of said first mirror assembly;

a second mirror assembly having a first end and a second end, said second mirror assembly including a second frame and a second mirror positioned in said second frame;

a second adjustable support having first and second ends, the first cad of said second adjustable support is connected to said base and the second end of said second adjustable support is rigidly connected to a central portion of the first end of said second mirror assembly;

said base including a blade at a right angle to a portion of said base for positioning said base onto a top shoulder of said chair; and at least one strap means for securing said base to a middle section of said chair;

wherein the first ends of said first and second adjustable supports are mounted separately opposite each other on the top portion of said base and the first mirror of said first mirror assembly opposes the second mirror of said second minor assembly, whereby a person sitting in said chair can view three front and back portions of a person's head in said first mirror assembly.

2. The dual mirror beauty ensemble for use in combination with a chair according to claim 1, wherein said beauty ensemble further includes a third mirror assembly connected to the second end of said first mirror assembly and a forth mirror assembly connected to the second end of said second mirror assembly.

3. The dual mirror beauty ensemble for use in combination with a chair according to claim 1, wherein at least one of said first and second adjustable supports includes an extendable rod.

* * * * *